June 27, 1967 W. K. SCHROETER ET AL 3,327,540
GAS GYRO INERTIAL REFERENCE SYSTEM
Filed May 31, 1962 3 Sheets-Sheet 1

INVENTORS
WILHELM K. SCHROETER
VERNON J. BURNS
BY ROBERT C. FLINK
ROLAND PITTMAN

Price & Heneveld
ATTORNEYS

INVENTORS
WILHELM K. SCHROETER
VERNON J. BURNS
BY ROBERT C. FLINK
ROLAND PITTMAN

Price & Heneveld
ATTORNEYS

June 27, 1967 W. K. SCHROETER ET AL 3,327,540
GAS GYRO INERTIAL REFERENCE SYSTEM
Filed May 31, 1962 3 Sheets-Sheet 3

INVENTORS
WILHELM K. SCHROETER
VERNON J. BURNS
BY ROBERT C. FLINK
ROLAND PITTMAN

Price & Heneveld
ATTORNEYS 3,327,540
GAS GYRO INERTIAL REFERENCE SYSTEM
Wilhelm K. Schroeter, Vernon J. Burns, Robert C. Flink, and Roland Pittman, Grand Rapids, Mich., assignors to Lear Siegler, Inc.
Filed May 31, 1962, Ser. No. 208,660
(Filed under Rule 47(a) and 35 U.S.C. 116)
10 Claims. (Cl. 74—5.37)

This invention concerns gyroscopic reference systems for missiles, and more particularly gas operated stable platform devices.

Inertial guidance systems are among the most crucial components of missiles; yet, like all other parts of the missile, they present an ever-present problem of space, weight, and cost. The continuing purpose of guidance system design is therefore to build a sufficiently accurate guidance system at the lowest cost consistent with the permissible reliability, space and weight. In the past, guidance systems for missiles have customarily relied on electrically driven gyroscopic devices. Any precession of the gyroscope about any of its gimbal axes was sensed by electrical circuitry, and the incipient precession was immediately corrected by torque motors driven through complex proportional amplifiers. This system had the disadvantage of requiring heavy and expensive electrical drive machinery, a reliable power supply, delicate electronic circuitry, and torque motors of sufficient size to compensate for any torque surges for which they might be required to compensate during the operation of the gyroscopic device.

The present invention takes advantage of the fact that most missiles travel for only a comparatively short time between launch and impact on the target to considerably simplify the gyroscopic reference system and reduce its cost without sacrificing any efficiency. To achieve this, the invention teaches the use of a stabilized member stabilized by three gyros, each positioned to stabilize one of the axes of a spatial coordinate system. The three gyros are run up just before launch by a gas under high pressure, and are then allowed to coast during the entire flight of the missile. With proper design precautions, some of which involve novel and inventive structures disclosed herein, it is possible to maintain free rotation of the gyros at a speed sufficient for accurate control for a time long enough for the missile to complete its flight. A maximum coasting time is achieved not only by the fact that the inertia wheels can be made comparatively large and heavy because of the lack of any electrical drive equipment, but also by sealing the gyro housing after run-up, and using as a coasting environment a gas of very small molecular weight. In order to eliminate the electrical sensing machinery and amplifiers for immediately compensating for any precession-causing torques, the present invention uses only the mechanical gyroscopic effect of the gyros to hold the stabilized member in its stabilized position. In this system, the gyros simply absorb any bearing torques and other torques applied thereto by precessing. The torques involved are normally sufficiently small to cause relatively little precessing in the short duration of a missile flight. This small precession is insufficient to seriously impair the gyro's stabilizing effectiveness.

It is therefore the object of this invention to provide a short-term inertial reference system of maximum effectiveness at lowest cost for a given weight and size.

It is a further object of this invention to provide a coasting gyro system with the longest possible coasting life following an initial run-up.

It is a still further object of this invention to provide an inertial reference system of the stable platform type in which the gyroscopic forces of the gyros are used directly and without compensation to stabilize the stabilized member.

It is still another object of this invention to provide an inertial reference system in which the gyros are mounted on the outside of the stabilized member for easy maintenance.

These and other objects of this invention will become apparent from the following description, taken in connection with the accompanying drawings, in which.

Basically, the invention consists of stabilizing a stabilized member by a system of three orthogonally oriented gyros which are free to precess within a limited range to mechanically hold the stabilized member in its reference position. Further in accordance with the basic concept, the gyros are run up to an extremely high angular velocity prior to launch of the missile by pressured gas from a source which may be external to the missile, and are then allowed to coast during the entire duration of the mission of the missile.

To carry out this concept, the invention provides for the gas-tight sealing of the gyro housing after run-up so as to reduce windage losses within the housing and get effects to a minimum and prolong the coasting life of the gyro to the greatest possible extent. Windage losses are further reduced in accordance with the invention by dimensioning the inertia wheel and housing in such a manner as to obtain laminar flow, and by setting the housing exhaust valve so as to reduce the gas pressure in the housing as the missile ascends to high altitudes.

Figure 1:
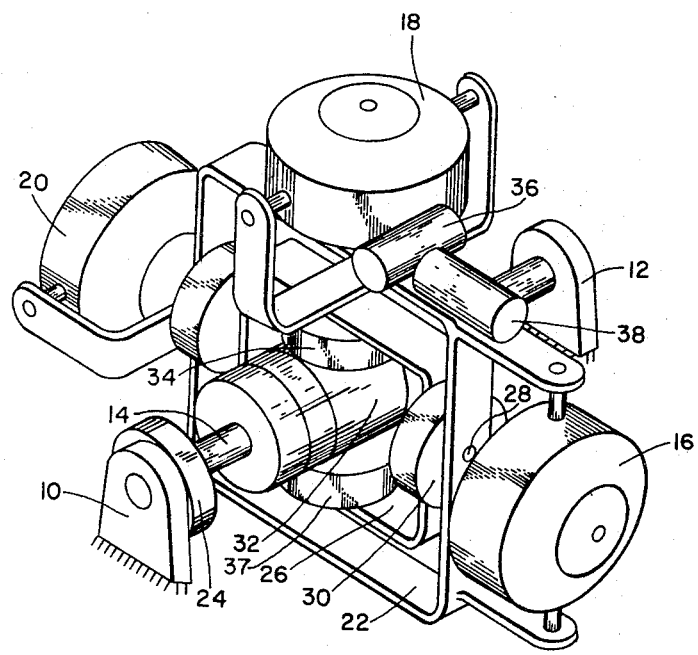
FIG. 1 is a schematic view showing the relative arrangement of the components of the inertial reference system of this invention.

Referring now to FIG. 1, the body of the missile is represented by the grounded supports 10, 12. A pitch axis shaft 14 is journaled in the supports 10, 12 and supports the guidance system mechanism. It will be noted in FIG. 1 that the pitch axis is the only axis of complete freedom, i.e. the only axis about which the system can turn three hundred and sixty degrees without hitting anything. The reason for this choice is that the attitude of a missile will normally vary substantially only in pitch, with the roll and yaw variations being rather minor. Consequently, it will be understood that, depending on the motion of the vehicle carrying the inertial reference system of this invention, the spatial attitude of the various axes described herein may be changed as desired.

It will be seen that the pitch gyro 16, roll gyro 18, and yaw gyro 20 are all mounted on the outside of the stabilized member 22 in brackets which are fixed with respect thereto. Consequently, the operation of the gyros 16, 18, 20 will cause the stabilized member 22 to assume a fixed reference attitude in space regardless of the motion of the missile. If the missile pitches with respect to the stabilized member, the supports 10, 12 will move about the pitch axis shaft 14, and this movement will be sensed by the pitch angle transducer 24 and transmitted to the autopilot computer in a well-known manner. If the missile rolls, the roll gimbal 26 will turn with respect to the stabilized member 22 about the roll axis shaft 28. This motion is sensed by the roll angle transducer 30 and is transmitted to the autopilot in a well-known manner. If the missile yaws, the yaw gimbal 32 pivots with respect to the roll gimbal 26, and this movement is sensed by the yaw angle transducer 34 and is also transmitted to the autopilot in a well-known manner.

Inasmuch as the stabilized member 22 is normally erected in the plane of the flight path, it can serve as the carrier of accelerometers such as, e.g., the down-range accelerometer 36 and the cross-range accelerometer 38. These devices provide an output from which the total displacement of the missile can be computed by double integration so that the missile may be properly reoriented if it deviates from its precomputed path in any direction.

It will be noted that the pitch gyro 16 and the yaw gyro 20 have a common spin axis in FIG. 1. The purpose of this arrangement is to reduce the resultant torque on the stabilized member due to deceleration of the gyroscopes, by spinning the pitch gyro 16 and yaw gyro 20 in opposite directions so as to neutralize their reaction in torque moments. A torque generator 37 acting about the yaw gimbal axis compensates for the average rundown torque of the roll gyro 18.

Figure 2:
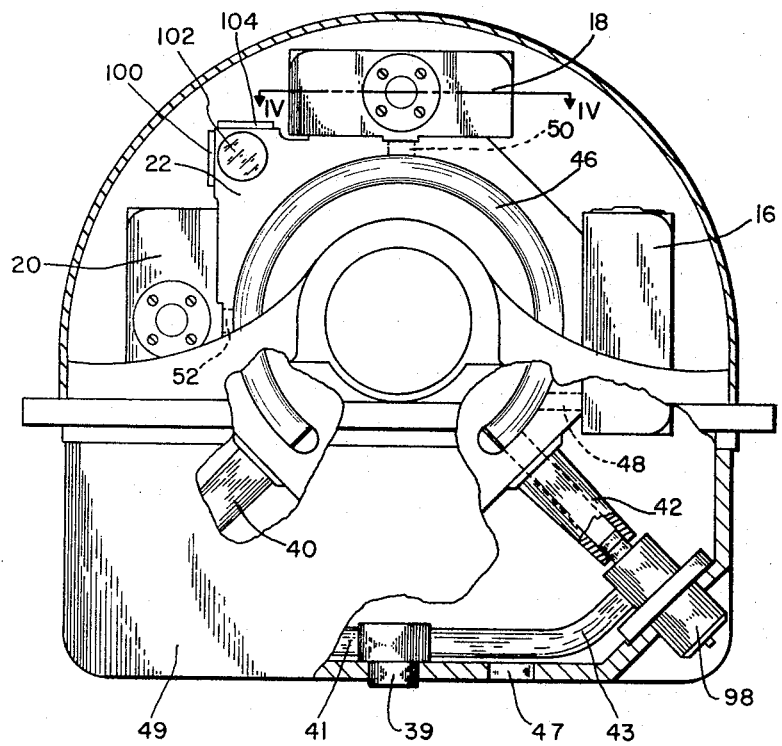
FIG. 2 is a side elevation of the stable platform of a typical embodiment of the invention.

FIG. 2 shows a typical embodiment of a stable platform according to FIG. 1 with its three gyros. As in FIG. 1, 22 indicates the stabilized member, 16 is the pitch gyro, 18 is the roll gyro, and 20 is the yaw gyro. For the run-up of the gyros, a gaseous fluid under pressure is introduced into the stabilized member 22 from an inlet 39 fixed with respect to the missile through ducts 41, 43 and passages formed in the caging feet 40, 42. From there, gas is fed into the fluid conduit 46 from which it is discharged into the frames of the gyros 16, 18, 20 through passages 48, 50, 52 respectively. It will be noted that the fluid conduit 46 is supplied with gas from both ends. The reason for this symmetrical arrangement is that it makes it possible to deliver fluid to each of the gyros at approximately the same flow rate, which in turn causes the gyros to spin at approximately the same angular velocity.

It will be understood that during run-up, the gas inlet 39 is connected to a suitable gas supply which may be external of the missile, and the adequate provisions such as a port 47 are made to exhaust used gas from the case 49 in which the device is mounted.

Figure 3:
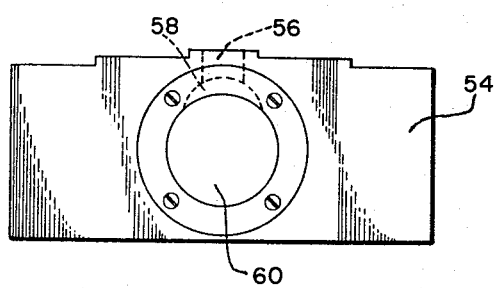
FIG. 3 is an enlarged side elevation of one of the gyro frames used in this invention.

Turning now to FIG. 3, it will be seen that gas from e.g. passage 48 enters the gyro frame 54 through frame duct 56 and discharges into the frame plenum 58 which lies directly behind the precession axis cover 60.

Figure 4:
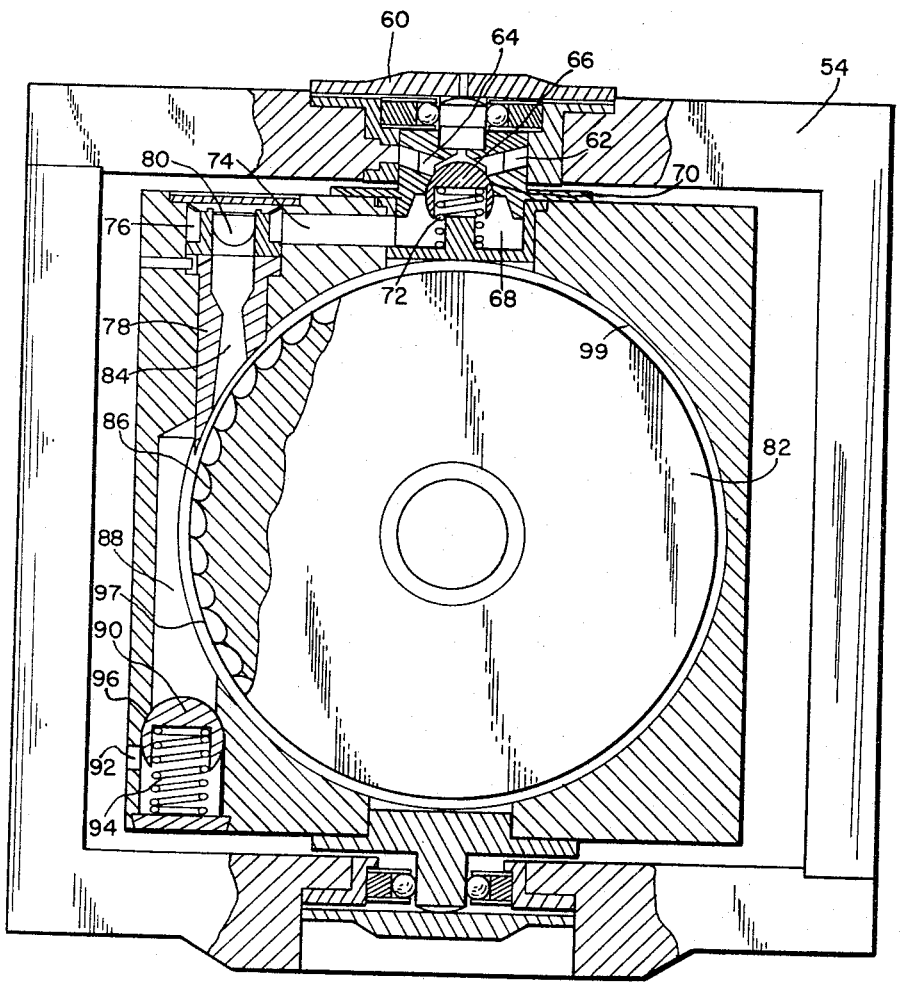
FIG. 4 is a horizontal section along line IV—IV of FIG. 2.

As will best be seen from FIG. 4, fluid from the frame plenum 58 (FIG. 3) is discharged into the annular groove 62. From there, it travels through the precession bearing ducts 64 past the inlet check valve 66 into the inlet valve plenum 68. The inlet valve 66 is forced against the inlet valve seat 70 by a spring 72. The fluid next travels through the transfer duct 74 into the venturi plenum 76. From there, it enters the venturi 78 through apertures 80 and is discharged from the venturi 78 against the inertia wheel 82 through the nozzle 84. The fluid impinges on the inertia wheel 82 at a great speed and enters the pockets 86 to drive the inertia wheel 82 in the manner of a turbine. The spent fluid exits through the exhaust duct 88 past the exhaust valve 90 into the exhaust port 92 from which it is discharged into the case 49 (FIG. 2) containing the inertial reference system. A spring 94 is provided to urge the exhaust valve 90 against its valve seat 96.

On order to obtain laminar flow of the gas surrounding inertia wheel, the present invention provides that the perimeter 97 of the inertia wheel 82 is spaced approximately 25–30 mils from the bore 99 of the housing. This spacing represents the region of minimum windage loss between the high drag of the skin effect and the high drag of turbulence.

OPERATION

When the inertial reference system of this invention is mounted in a missile and the missile is made ready for launch, the stabilized member 22 and the gyros 16, 18 and 20 are first caged, i.e. they are made fast with respect to the missile by appropriate mechanical means such as, for example, the cagers 98 (FIG. 2) and erecting devices (not shown). The missile is now aligned by well-known techniques, e.g. by optical means using the mirrors 100, 102, 104 (FIG. 2). When the inertial reference system has thus been precisely aligned with reference spatial coordinates, high pressure gas is fed to the gas inlet 39 and hence to the fluid passages in the caging feet 40, 42. The caged gyros 16, 18, 20 are quickly brought up to speed by the pressurized fluid stream, and when they have attained their maximum velocity (which is much higher than the maximum velocity obtainable with electrically driven gyros) the gas supply is shut off and the gyros and stabilized member are uncaged. The shutting off of the gas supply immediately results in closure of the inlet valve 66 by its spring 72. With the inlet valve 66 closed, the gas pressure within the gyro housing drops rapidly as long as exhaust valve 92 remains open. When the gas pressure within the gyro housing drops to a value just slightly (e.g. about 0.1 atmosphere) above ambient pressure, spring 94 closes exhaust valve 92. The gyro housing is now completely closed, and the pumping action of the inertia wheel cannot cause gas flow from the gyro housing, thus avoiding any drift-causing jet effect and interaction between the gyros. The closed space also removes the aerodynamic load from the inertia wheel, much in the same manner as a fan can be unloaded by closing its inlet and outlet. Thus, the closing of the gyro housing, coupled with the lightness of the helium gas used in the last stages of run-up to drive the inertia wheel 82, and with the dimensioning of the inertia wheel and housing to obtain optimum laminar flow, combines to reduce the windage losses to a minimum.

It will be understood that, if desired, the inertia wheels 82 may be maintained at maximum speed for any desired length of waiting time by maintaining the pressurized fluid flow with comparatively little expenditure of gas until the missile is ready to be fired.

When the gyros are uncaged and spinning, the missile is ready to go. As the missile follows its flight path, the gimbals 26, 32 turn with respect to the stabilized member 22, and this movement is sensed by the angle transducers 30, 32 and 24 and transmitted to the autopilot system for corrective action if necessary.

The resulting saving in weight and volume, together with the saving of the weight and volume of the electrical drive mechanism for the gyros themselves, makes is possible to make the inertia wheels 82 quite large and heavy, so that they will coast for a very long time without losing their effectiveness, which is determined by the formula $$\frac{T}{H} = \omega$$

in which T is the torque about the stabilized axis, H is the momentum of the inertia wheel about its spin axis, and $\omega$ is the angular precession velocity about the precession axis.

Another advantage of the device of this invention is that as the missile ascends to high altitude, the resulting decrease in ambient pressure causes the valve 90 to reopen enough to maintain a constant pressure differential between the inside of the gyro housing and the ambient atmosphere. Thus, the ascent of the missile causes gradual evacuation of the gyro housing, whereby windage losses are reduced more and more as the missile gains altitude, but are held at their lowest level when the missile descends again.

It will be seen that the present invention provides an effective, simple, and reliable inertial reference system for missiles. Obviously, the teachings of this invention can be carried out in many different ways, of which the embodiment shown and described herein is merely illustrative. We therefore do not desire to be limited in any way by the embodiment shown, but only by the definition of the invention as expressed in the following claims.

We claim:

1. An inertial reference system comprising: a stabilized member; gyroscopic means for stabilizing said member, said gyroscopic means including at least one gyro means rotatably mounted on said stabilized member for each of three intersecting spatial coordinate axes and mounted in torque transmitting relationship with respect to said stabilized member about said axes; each of said gyro means including an inertia wheel mounted about one of said axes and having means for imparting spinning motion thereto upon discharge of a high velocity fluid stream thereagainst; and means for discharging a high velocity fluid stream against each of said wheels, said last mentioned means including a fluid supply and a fluid path leading to each of said gyro means.

2. An inertial reference system for a missile comprising: a stabilized member; mounting means for said stabilized member for allowing said missile to rotate a predetermined number of degrees about any of the three coordinate axes without necessarily affecting the spatial position of said stabilized member; and gyroscopic means for stabilizing said member, said gyroscopic means including separate gyro means rotatably mounted on said stabilized member for stabilizing said member about each of the three spatial coordinate axes; and mounted in torque transmitting relationship with respect to said stabilized member about said axes, each of said gyro means including an inertial wheel mounted about one of said axes and having means for imparting spinning motion thereto upon discharge of a high velocity fluid stream thereagainst; means for discharging a high velocity fluid stream against each of said wheels; two of said gyro means being mounted to have a common spin axis but being spun in opposite directions to reduce the resultant torque applied to said stabilized member; said gyroscopic means including means for easily connecting and disconnecting the fluid stream leading to said spin-imparting means before the flight of said missile.

3. An inertial reference system comprising: a stabilized member; gyroscopic means for stabilizing said member, said gyroscopic means including separate gyros for each of the spatial coordinate axes; each of said gyros including an inertia wheel having means for imparting spinning motion thereto upon discharge of a high velocity fluid stream thereagainst; and means for discharging a high velocity fluid stream against said wheel, said last-named means including a fluid supply and a fluid path leading from said fluid supply to said gyros, said fluid supply being so arranged as to supply fluid to both ends of said path so as to deliver substantially equal flow rates of fluid to each of said gyros.

4. An inertial reference system comprising: a stabilized member; gyroscopic means for stabilizing said member, said gyroscopic means having separate gyros for each of the spatial coordinate axes; each of said gyros being mounted outside of said stabilized member and adjacent thereto; each of said gyros including an inertia wheel having means for imparting spinning motion thereto upon discharge of a high velocity fluid stream thereagainst; and means for discharging a high velocity fluid stream against said wheel, said means including a fluid supply; a fluid path extending around a substantial portion of the periphery of said stabilized member and communicating with each of said gyros; said fluid path being arranged to receive fluid from said fluid supply at both of its ends, said ends being symmetrically disposed with respect to said gyros so as to supply fluid at substantially equal flow rates to each of said gyros.

5. An inertial reference system for a missile, comprising: a stabilized member; gyroscopic means for stabilizing said member; said gyroscopic means including an inertia wheel having means for imparting spinning motion thereto upon discharge of a high velocity fluid stream thereagainst; means for discharging a high velocity fluid stream against said wheel only before said missile is in flight, means for operatively disconnecting said last-named means before said flight to thereby cut off the fluid stream during the flight of said missile; a housing enclosing said inertia wheel; and valve means associated with said fluid discharge means for gas-tightly sealing said housing when said fluid discharging means are inoperative.

6. The device of claim 5, in which said valve means include an inlet valve and an exhaust valve, said inlet valve being arranged to close as soon as said fluid discharging means become inoperative, and said exhaust valve being arranged to close only when the gas pressure within said housing approaches ambient atmospheric pressure, whereby said housing is substantially sealed during the flight of said missile but is partially evacuated by a decrease in ambient atmospheric pressure in the course of said flight.

7. The device of claim 5, in which said fluid is a gas of low molecular weight as compared to nitrogen.

8. An inertial reference system for a missile, comprising: a stabilized member; gyroscopic means for stabilizing said member; said gyroscopic means including separate gyros for each of the spatial coordinate axes; each of said gyros being arranged to cumulatively absorb torques acting thereon by precession through a substantial range; each of said gyros including an inertia wheel having means for imparting spinning motion thereto upon discharge of a high velocity fluid stream thereagainst; and means operatively connected to said gyros for discharging a high velocity fluid stream against said wheel only before said flight; means for easily operatively connecting and disconnecting said last-named means from said gyros before said flight to cut off the fluid stream during the flight of said missile; two of said gyros having a common spin axis but being spun in opposite directions to reduce the resultant torque on said stabilized member.

9. An inertial reference system for a missile, comprising: a stabilized member; gyroscopic means for stabilizing said member; said gyroscopic means including a separate gyro for each spatial coordinate axis, each of said gyros including an inertia wheel having means for imparting spinning motion thereto upon discharge of a high velocity fluid stream thereagainst; means operatively connected to said gyros for discharging a high velocity fluid stream against said wheel only before said flight; means for easily operatively connecting and disconnecting said last-named means from said gyros and only before said flight to cut off the fluid stream during the flight of said missile; said fluid discharging means including a fluid supply and a fluid supply path for conveying fluid from said fluid supply to each of said gyros; said fluid path being arranged to receive fluid from said fluid supply at both of its ends and being disposed symmetrically with respect to said gyros so as to deliver substantially equal flow rates of fluid to each of said gyros; a housing enclosing said inertia wheel; and check valve means for gas-tightly sealing said housing when said fluid discharging means is inoperative; said check valve means closing at pressure levels such as to cause partial evacuation of said housing upon reduction of ambient atmospheric pressure after said fluid discharging means become inoperative; said fluid being a gas having a low molecular weight as compared to nitrogen.

10. An inertial guidance system for a missile, comprising: a stabilized member; gyroscopic means for stabilizing said member; said gyroscopic means including a separate gyro for each of the spatial coordinate axes, said gyros being mounted on the perimeter of said stabilized member and on the outside thereof; two of said gyros having a common spin axis but opposite spin directions to reduce the resultant torque on said stabilized platform; said gyros being arranged to mechanically hold said stabilized member in a stable position and to absorb torques applied thereto by precession through a limited but substantial range; each of said gyros including an inertia wheel having means for imparting spinning motion thereto upon discharge of a high velocity fluid stream thereagainst; means for discharging a high velocity fluid stream against said wheels, said last-named means including a fluid supply and a fluid path formed along the perimeter of said stabilized member and being arranged to receive fluid from said supply at both of its ends and convey said fluid to said gyros through apertures communicating with said gyros and located substantially symmetrically with respect to said ends; each of said gyros including a housing enclosing said inertia wheel; and a fluid inlet check valve and fluid exhaust check valve in said housing; said inlet check valve and said outlet check valve closing at such pressure differentials as to permit partial evacuation of said housing by a decrease in ambient atmospheric pressure following closure of said inlet check valve when said fluid discharging means become inoperative but otherwise gas-tightly sealing said housing; said fluid being helium.

References Cited

UNITED STATES PATENTS

| | | | |
|---|---|---|---|
| 1,510,487 | 10/1924 | MacFarlane et al. | 74—5.7 |
| 1,930,082 | 10/1933 | Boykow | 74—5.34 X |
| 1,950,517 | 3/1934 | Rawlings | 74—5.34 X |
| 2,900,824 | 8/1959 | Barnes | 74—5.34 |
| 2,964,953 | 12/1960 | Conley et al. | 74—5.7 |

FOREIGN PATENTS 164,684   1/1954   Australia.

FRED C. MATTERN, Jr., *Primary Examiner.*

BROUGHTON G. DURHAM, *Examiner.*

K. DOOD, P. W. SULLIVAN, *Assistant Examiners.*